UNITED STATES PATENT OFFICE.

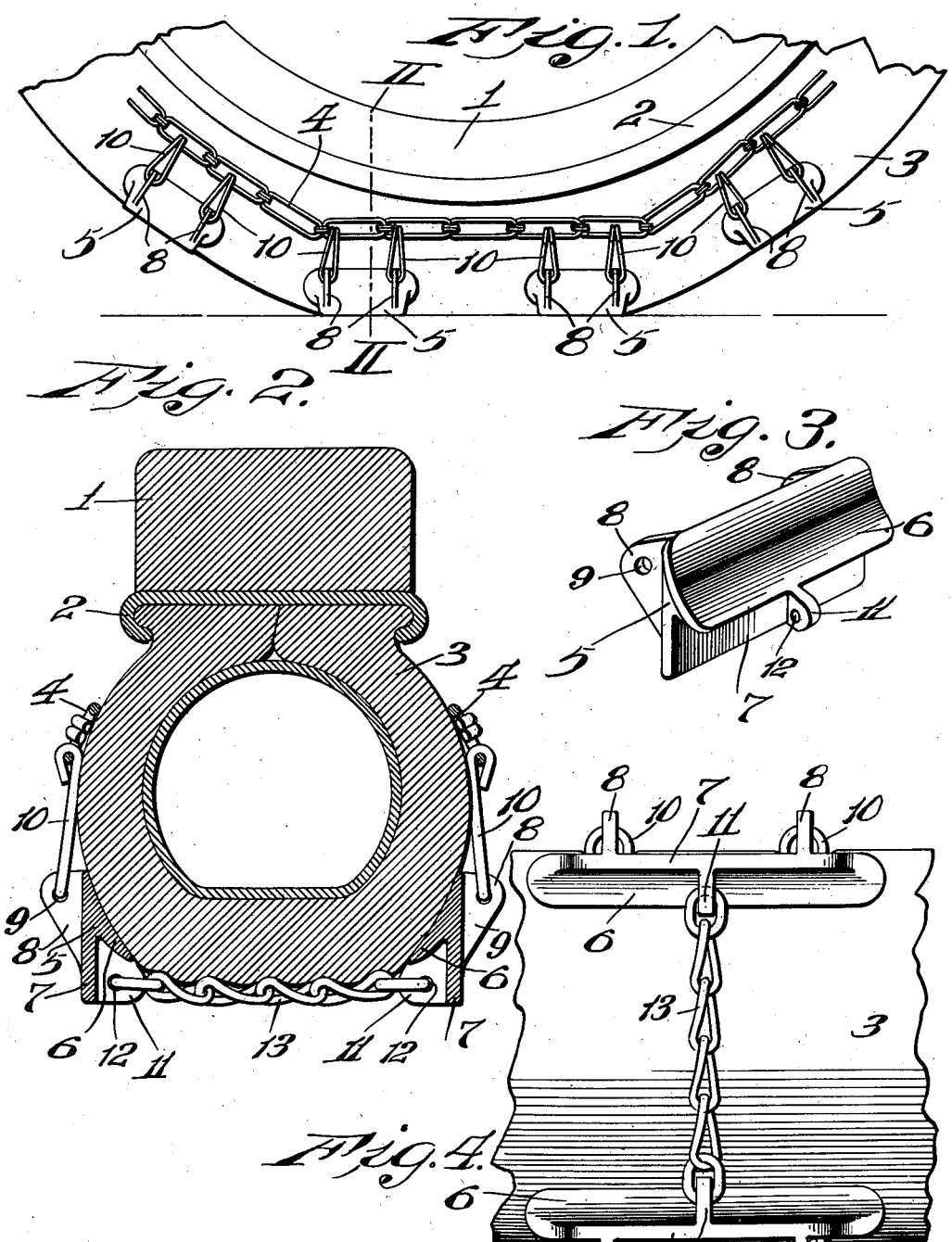

CORTEZ V. PUGH, OF ST. LOUIS, MISSOURI, ASSIGNOR OF FOUR-EIGHTEENTHS TO EDWARD BROCKSCHMITT, FOUR-EIGHTEENTHS TO ARVILLE A. VAN CLEAVE, AND FOUR-EIGHTEENTHS TO JOHN SCHULZ, ALL OF ST. LOUIS, MISSOURI.

GRIP-TREAD AND MUD-SHOE FOR AUTOMOBILES.

1,028,490.   Specification of Letters Patent.   Patented June 4, 1912.

Application filed March 22, 1911. Serial No. 616,111.

*To all whom it may concern:*

Be it known that I, CORTEZ V. PUGH, a citizen of the United States, residing at St. Louis, in the State of Missouri, have invented certain new and useful Improvements in Grip-Treads and Mud-Shoes for Automobiles, of which the following is a specification.

This invention relates to a combined grip tread and mud shoe for automobiles, and has for its primary object to provide an improved construction, combination and arrangement of parts in devices of this character.

One of the objects of the present invention is to provide an improved device of this character of the collapsible type for providing auxiliary grips or treads at regularly spaced intervals around the periphery of the wheel.

Another object is to provide an improved device of this character which embodies mud shoes of improved construction, and improved means for mounting said mud shoes upon the wheel.

Other and further objects will appear in the specification and be specifically pointed out in the appended claim, reference being had to the accompanying drawings exemplifying the invention and in which, Figure 1 is a fragmentary side elevation of a wheel provided with my improved tire grip and tread. Fig. 2 is a section on the line II—II, Fig. 1. Fig. 3 is a perspective view of one of the mud shoes. Fig. 4 is an enlarged fragmentary bottom plan view of a wheel with my improved device attached.

Referring more particularly to the drawings, the portion of a wheel of well known type is shown having a felly 1, tire gripping rim 2, and tire 3. Extending around the periphery of the tire on either side thereof, are endless chains 4, while at regular intervals around the outer lateral face or tread of the tire 3 are disposed a plurality of mud shoes 5, there being a series of these mud shoes on each side of the tire, as shown in Figs. 2 and 4. As shown in Fig. 3, each of said mud shoes comprises a base plate 6 having its inner face concaved to fit the curved wall of the tire, and with a depending keel or blade 7 which, when the shoes are mounted in oppositely disposed pairs, projects vertically down, as shown in Fig. 2. On the outer flat wall of each of said shoes, are disposed a pair of substantially triangular shaped lugs or ears 8 provided with apertures 9 for the reception of links 10 which pass therethrough and serve to secure them to the endless chains 4 extending around the peripheries of the wheel. On the inner face of the blade 7 of each of the mud shoes and intermediately of the ends of said shoe, is a lug or plate 11 provided with an aperture 12, these lugs on oppositely disposed shoes projecting toward each other when in position on the tire and offering suspension means for a chain grip or tread 13. By this means, as shown best in Fig. 2, each of the tire grip treads comprises a pair of oppositely disposed keels or blades 7 connected by the chain grips 13. It will be appreciated that the inturned lugs 11 with the connecting chain 13, in each instance, constitute a kind of paddle or cog which sinks into the mud and serves to give the wheel an enhanced purchase. At the same time, the blades 7 by reason of their disposition and rigid connection with the mud shoes, are adapted to grip the walls of a rut and hold the wheel to its course in the manner of the keel of a boat.

What I claim is:

In a device of the character described, the combination with a pair of endless chains of smaller diameter than the wheel, said chains being arranged on opposite faces of the wheel, of a plurality of grip treads, each of said grip treads comprising a pair of mud shoes provided with base portions conforming to the tire, said base portions being connected at both ends to said endless chains, respectively, a mud blade projecting outwardly from each mud shoe, said mud blades being arranged parallel to each other, a reinforcing lug integral with said blade and base portion of each shoe, and a grip tread chain connecting said lugs together.

CORTEZ V. PUGH.

In the presence of—
 J. B. MCGOWN,
 M. C. HAMMON.